(12) United States Patent
Yim et al.

(10) Patent No.: US 9,392,207 B2
(45) Date of Patent: Jul. 12, 2016

(54) BROADCAST RECEIVING APPARATUS AND METHOD FOR PROVIDING WIDGET SERVICE THEREOF

(75) Inventors: Jin-ho Yim, Suwon-si (KR); Seung-chul Shin, Gangneung-si (KR); Sang-gon Song, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 924 days.

(21) Appl. No.: 12/622,552

(22) Filed: Nov. 20, 2009

(65) Prior Publication Data

US 2010/0165201 A1    Jul. 1, 2010

(30) Foreign Application Priority Data

Dec. 30, 2008  (KR) .......................... 10-2008-0136965

(51) Int. Cl.
| | | |
|---|---|---|
| *H04N 21/43* | (2011.01) | |
| *H04N 5/445* | (2011.01) | |
| *H04N 21/431* | (2011.01) | |
| *H04N 21/435* | (2011.01) | |
| *H04N 21/488* | (2011.01) | |
| *H04N 21/81* | (2011.01) | |

(52) U.S. Cl.
CPC ......... *H04N 5/44591* (2013.01); *H04N 21/435* (2013.01); *H04N 21/4316* (2013.01); *H04N 21/488* (2013.01); *H04N 21/8126* (2013.01)

(58) Field of Classification Search
None
See application file for complete search history.

(56) References Cited

U.S. PATENT DOCUMENTS

| | | | |
|---|---|---|---|
| 7,197,715 B1* | 3/2007 | Valeria .......................... | 715/747 |
| 2004/0078814 A1* | 4/2004 | Allen .............................. | 725/47 |
| 2005/0208913 A1 | 9/2005 | Raisinghani et al. | |
| 2005/0240965 A1* | 10/2005 | Watson .............. | H04N 5/44543 725/45 |
| 2008/0244681 A1 | 10/2008 | Gossweiler et al. | |
| 2010/0211465 A1* | 8/2010 | Hughes et al. ............. | 705/14.53 |

FOREIGN PATENT DOCUMENTS

| | | |
|---|---|---|
| EP | 2001224 A2 | 12/2008 |
| KR | 10-2008-0023891 A | 3/2008 |
| WO | 02/49351 A2 | 6/2002 |
| WO | 2006/012343 A2 | 2/2006 |
| WO | 2008/025017 A2 | 2/2008 |

OTHER PUBLICATIONS

European Search Report, dated Oct. 4, 2010, issued in Application No. 09173762.7.
Communication from the Korean Intellectual Property Office dated Nov. 20, 2014, in a counterpart Korean application No. 10-2008-0136965.
Communication issued Oct. 16, 2015, issued by the European Patent Office in counterpart European Patent Application No. 09173762.7.

\* cited by examiner

*Primary Examiner* — Cai Chen
(74) *Attorney, Agent, or Firm* — Sughrue Mion, PLLC

(57) ABSTRACT

A method for providing a widget service in a broadcast receiving apparatus is provided. A method for providing the widget service includes operations of receiving widget information, and displaying on a picture-in-picture (PIP) screen at least part of all the received widget information which is to be fitted to the PIP screen, upon occurrence of a preset or trigger event. Therefore, it is possible for a user to construct a sub-screen for providing a widget service by selecting only part of widget information forming the entire display screen rather than reducing the size of the entire display screen.

17 Claims, 8 Drawing Sheets

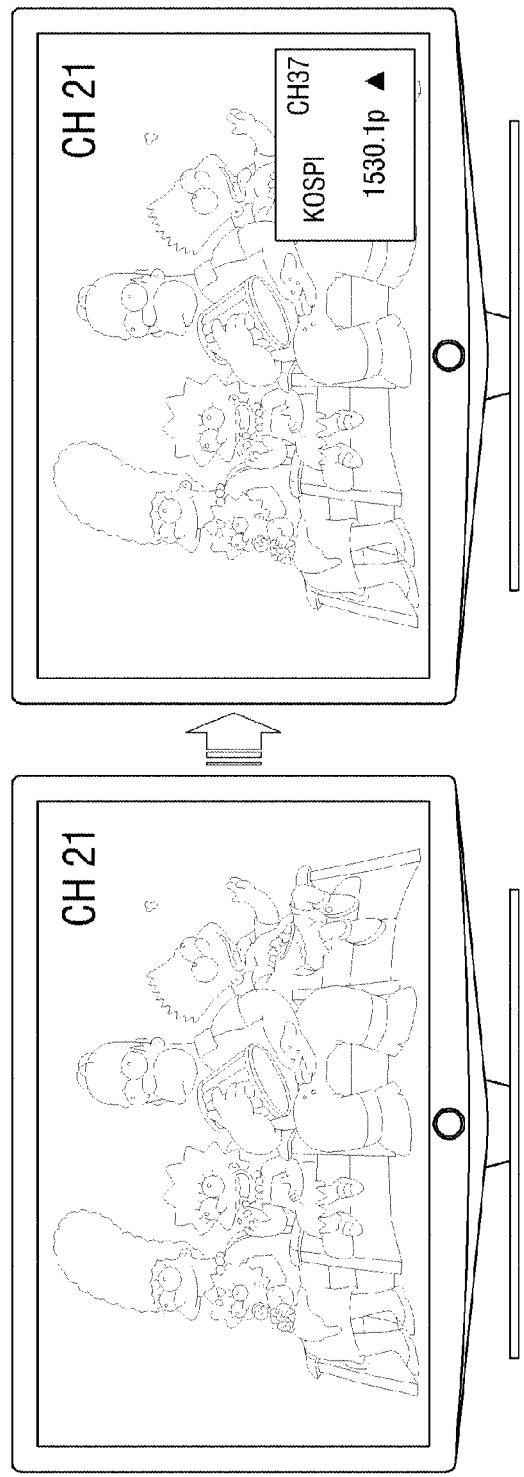

```
<title pip="enable"> Stock </title>
<date> now(); </date>
<point pip="enable"> current_point(); </point>
```

BROADCAST RECEIVING APPARATUS AND METHOD FOR PROVIDING WIDGET SERVICE THEREOF

CROSS-REFERENCE TO RELATED APPLICATIONS

This application claims priority from Korean Patent Application No. 10-2008-0136965, filed on Dec. 30, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a broadcast receiving apparatus and a method for providing a widget service, and more particularly, to a broadcast receiving apparatus which forms a sub-screen using part of information regarding widgets displayed on the entire display screen, namely a main screen, and a method for providing a widget service using the broadcast receiving apparatus.

2. Description of the Related Art

Web acceptance models of an Internet Protocol Television (IPTV) include an open web method, in which information is received in the form of a web page from a service provider, a digital television (TV) portal method, in which an IPTV-based web service is provided to a user through a cooperation between an IPTV provider and a service provider, and a widget method, in which a content is received only from a service provider and displayed on a small window. Among these, the most widely applicable web acceptance model is a widget method, which is capable of providing multi-tasking such as simultaneously providing television viewing and a widget service, and a direct management although a user may not necessarily be a widget service provider.

Widgets or gadgets are miniature applications in which frequently used services are produced as icons, and may be operated independently. By executing a widget, it is possible to provide a content or operate an application program such as a clock independently without opening a web browser.

Technologies to display picture-in-picture (PIP) screens on one area of TV screens have been introduced as a result of the development of recent electronic technologies. Generally, such technologies enable an image displayed on the entire display screen to be reduced in size to fit a PIP screen and to be displayed on the PIP screen. Channels displayed on PIP screens may be changed according to user manipulation of remote controllers.

However, when an image displayed on the entire display screen is reduced in size to fit a PIP screen and is then displayed on the PIP screen, the image becomes too small, so it is difficult for viewers to exactly recognize the image on the PIP screen. In particular, when a screen containing texts is displayed, it is more difficult to recognize texts as compared to when a screen containing images is displayed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a broadcast receiving apparatus which rearranges widget information displayed on the entire display screen according to the size of a picture-in-picture (PIP) screen and provides a widget service, and a method for providing a widget service using the broadcast receiving apparatus.

According to an aspect of the present invention, there is provided a method for providing a widget service in a broadcast receiving apparatus, the method comprising receiving widget information, and displaying on a PIP screen at least part of all the received widget information which is to be fitted to the PIP screen, upon occurrence of a preset event.

During the displaying, at least one of the amount and the type of widget information displayed on the PIP screen may change according to a change in size of the PIP screen.

The method may further comprise providing a user interface (UI) window through which a user selects widget information used to construct a PIP screen from among the received widget information.

The method may further comprise requesting widget information which is to be fitted to the PIP screen.

The receiving may comprise receiving all widget information, and the displaying may comprise selecting widget information to be fitted to the PIP screen from among all the received information, rearranging the selected widget information according to the size of the PIP screen, and displaying the rearranged information on the PIP screen.

The widget information may be received in Markup Language from an external server or hub site.

The method may further comprise, if the size of the PIP screen is changed, extracting widget information to be fitted to the PIP screen of which the size has been changed, and displaying the extracted widget information on the PIP screen.

According to another aspect of the present invention, there is provided a method for providing a widget service in a broadcast receiving apparatus, the method comprising allocating a widget service to an available channel to create a widget service channel, extracting at least part of widget information which is to be fitted to a PIP screen from all widget information required to provide the widget service, and displaying the extracted widget information on the PIP screen, upon occurrence of an event to display a widget service channel on the PIP screen.

During the displaying, at least one of the amount and the type of widget information displayed on the PIP screen may change according to a change in size of the PIP screen.

The event may occur when a PIP screen for displaying a widget service is executed or when a channel of a PIP screen for general broadcasting is changed from a general broadcast channel to a widget service channel.

The method may further comprise providing a UI window through which a user selects widget information used to construct a PIP screen from among all the widget information.

The widget information may be received in Markup Language from an external server or hub site.

The displaying may comprise displaying a plurality of PIP screens, and widget information enough to fill each of the plurality of PIP screens may appear on each of the plurality of PIP screens.

The method may further comprise, if the size of the PIP screen is changed, re-extracting widget information to be fitted to the PIP screen of which the size has been changed, and displaying the re-extracted information on the PIP screen.

According to another aspect of the present invention, there is provided a broadcast receiving apparatus comprising a receiver which receives widget information, and a display unit which displays on a PIP screen at least part of all the received widget information which is to be fitted to the PIP screen, upon occurrence of a preset or trigger event.

At least one of the amount and the type of widget information displayed on the PIP screen may change according to a change in size of the PIP screen.

The broadcast receiving apparatus may further comprise a UI unit which provides a UI window through which a user selects widget information used to construct a PIP screen from among the received widget information.

The widget information may be received in Markup Language from an external server or hub site.

The broadcast receiving apparatus may further comprise a controller which allocates a widget service to an available channel to create a widget service channel, and a scanning unit which scans channels. If there is an available channel among the scanned channels, the controller may allocate a widget service to the available channel to create a widget service channel.

If the size of the PIP screen is changed, the display unit may display widget information to be fitted to the PIP screen of which the size has been changed.

BRIEF DESCRIPTION OF THE DRAWINGS

The above and/or other aspects of the present invention will be more apparent by describing certain exemplary embodiments of the present invention with reference to the accompanying drawings, in which:

FIGS. 4A and 4B are views illustrating an example of a method for providing a widget service upon occurrence of events, according to an exemplary embodiment of the present invention;

DETAILED DESCRIPTION OF EXEMPLARY EMBODIMENTS

Figure 1:
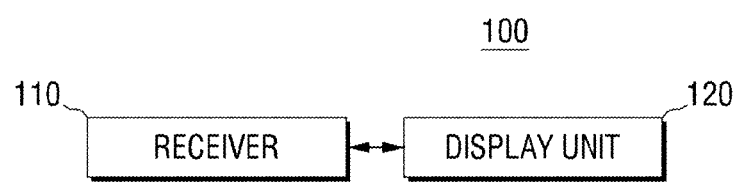
FIG. 1 is a block diagram of a broadcast receiving apparatus according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in excessive detail since they would obscure the invention unnecessarily.

FIG. 1 is a block diagram of a broadcast receiving apparatus 100 according to an exemplary embodiment of the present invention. The broadcast receiving apparatus 100 of FIG. 1 comprises a receiver 110 and a display unit 120.

The receiver 110 receives widget information. Herein, the receiver 110 may be implemented as a network interface card (NIC).

The display unit 120 displays at least part of all the received widget information which is to be fitted to a picture-in-picture (PIP) screen, upon occurrence of a preset or trigger event. In other words, if the size of the PIP screen is changed, at least one of the amount and the type of widget information displayed on the PIP screen may also be changed.

For example, if the size of the PIP screen is large, the display unit 120 may reconstruct the PIP screen using a greater amount of widget information and display the reconstructed PIP screen. In this situation, the PIP screen may show a variety of contents among all the received widget information. Alternatively, if the size of the PIP screen is small, the display unit 120 may reconstruct the PIP screen using a relatively less amount of widget information and display the reconstructed PIP screen. In this situation, the PIP screen may be displayed even using a minimum amount of content. Additionally, a change in the size of the PIP screen enables both the amount of widget information and the type of widget information to be changed in various combinations.

If the size of the PIP screen is changed later, the display unit 120 also displays widget information to be fitted to the PIP screen of which the size has been changed. The broadcast receiving apparatus 100 may further comprise an extracting unit (not shown) which extracts widget information to be fitted to the PIP screen of which the size has been changed and displays the extracted widget information.

After the receiver 110 receives all the widget information, the display unit 120 selects widget information to be fitted to the PIP screen from among all the received information, rearranges the selected widget information according to the size of the PIP screen, and displays the rearranged information on the PIP screen.

Herein, the widget information may comprise various kinds of information received from an external server or a hub site in order to provide widget services. For example, the broadcast receiving apparatus 100 may receive information regarding a weather widget. In this situation, the received information may be information on all items required to provide widget services such as local weather conditions, hourly weather conditions or weather icons (for example, cloud, rain, lightning, sun icons) which are to be displayed on a display screen of the broadcast receiving apparatus 100. Additionally, widget information may comprise various widgets such as a weather widget, a news flash widget or a game widget. In other words, the widget information may comprise various kinds of contents received from an external source.

Moreover, widget information may be received in Markup Language such as Hypertext Markup Language (HTML) or Extensible Markup Language (XML). Broadcast signals used to provide widget services may be provided in Markup Language in a different manner from general broadcast signals transmitted from broadcasting stations. Therefore, it is possible for a viewer to select only part of widget information, namely a broadcast signal provided to the viewer, and to edit the widget information.

The display unit 120 may comprise a main screen and a sub-screen. In general, the main screen may be the entire display screen, and the sub-screen may be a small-sized PIP screen which appears on a predetermined or desired area of the entire display screen. In this situation, if the PIP screen is magnified, the main screen and sub-screen may be displayed in the form of a double window. Additionally, if a widget service is allocated to a predetermined channel and a widget service channel is created, the widget service may be displayed on both the main screen and sub-screen.

If a user operates a remote controller to execute a PIP screen for displaying the widget service, or to change a general broadcast channel to the widget service channel while a PIP screen displays general broadcasting, a preset event may occur.

Herein, the broadcast receiving apparatus 100 may be either a television (TV) or a set-top box (STB). In general, the TV performs the above operations, but the STB mounted on the TV may also perform the above operations.

Figure 2:
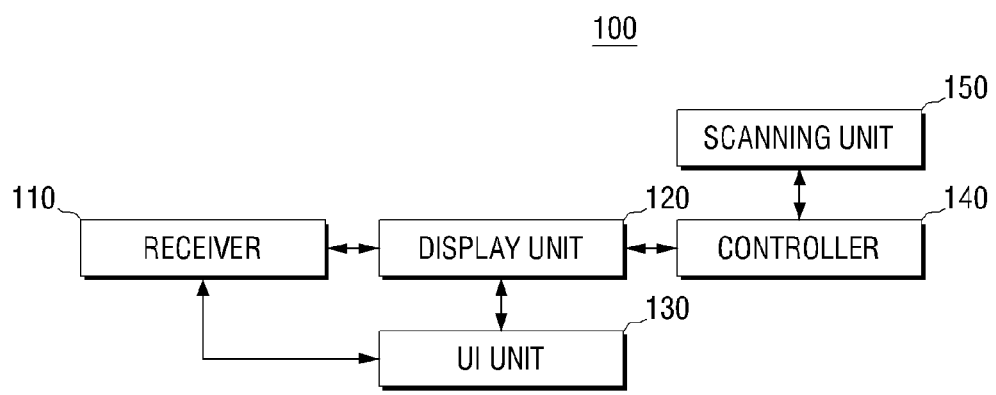
FIG. 2 is a detailed block diagram of the broadcast receiving apparatus of FIG. 1, according to an exemplary embodiment of the present invention.

FIG. 2 is a detailed block diagram of the broadcast receiving apparatus 100 of FIG. 1, in accordance with an exemplary embodiment of the present invention. In FIG. 2, the broadcast receiving apparatus 100 may further comprise a user interface (UI) unit 130, a controller 140 and a scanning unit 150 in addition to the receiver 110 and the display unit 120 described above.

The UI unit 130 provides a UI window through which a user selects widget information used to construct a PIP screen from among the received widget information. In more detail, when the display unit 120 displays on the PIP screen at least part of all the received widget information which is to be fitted to the PIP screen, the UI unit 130 provides a UI window so that a user is able to select widget information used to construct the PIP screen. The UI window may display all the widget information arranged according to the type of widget in the form of a pop-up window.

A user may construct a PIP screen by selecting desired items from items required to provide widget services such as local weather conditions, hourly weather conditions or weather icons, based on the weather widget information. For example, a user may construct a PIP screen using only 'weather in Seoul', or using 'weather in Seoul' and 'weather icons'.

The controller 140 allocates a widget service to an available channel and creates a widget service channel. In this situation, the available channel may be an empty channel. For example, if channels 30 to 40 from among channels 1 to 60 of the broadcast receiving apparatus 100 are currently empty, the scanning unit 150 may scan empty channels, and the controller 140 may allocate widget services to the empty channels, namely channels 30 to 40, respectively, to create widget service channels. Accordingly, the broadcast receiving apparatus 100 may comprise general broadcast channels and widget service channels. General broadcast channels may include terrestrial broadcasting, cable broadcasting or digital broadcasting services other than widget services.

In more detail, if a user is provided with various widgets (applications) received by the broadcast receiving apparatus 100 through a widget gallery, he or she may select a desired widget from the widget gallery, and the controller 140 may then allocate the selected widget to an empty channel.

If there is no empty channel, the controller 140 may create a virtual channel and allocate the widget service to the virtual channel. In this situation, since only a channel number is virtually allocated to the widget service, the virtual channel is not a channel with a predetermined frequency band received from an external source. For example, if a YTN broadcast is broadcast over a general broadcast channel 24, the controller 140 may create virtual channels 24-1, 24-2 and 24-3, and may allocate a weather widget and a news flash widget to channels 24-1 and 24-2, respectively. Therefore, a user can allocate a widget service to a specific channel even though there is no available channel.

The scanning unit 150 scans channels. In more detail, upon determining that there is an available channel among the scanned channels, the controller 140 allocates a widget service to the available channel and creates a widget service channel. The scanning unit 150 may be implemented as a tuner. If the display unit 120 comprises a main screen and a sub-screen, two tuners may be required. Alternatively, if the display unit 120 comprises a main screen and a plurality of sub-screens, a plurality of tuners may be required.

Figure 3:
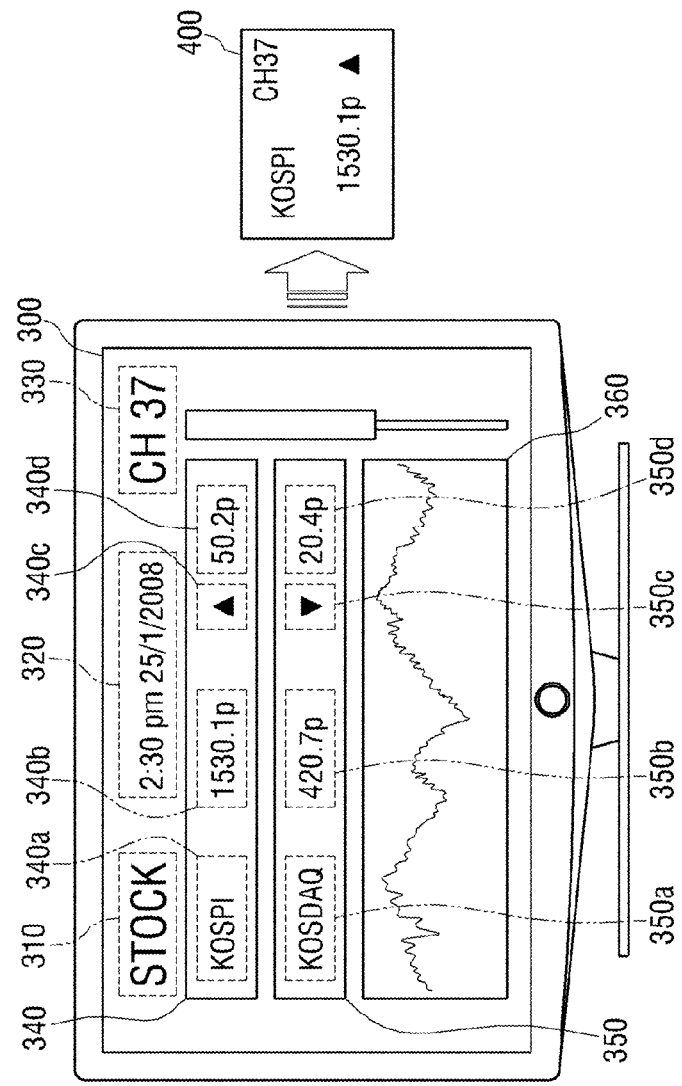
FIG. 3 is a view illustrating an example of a display unit comprising a main screen and a sub-screen, according to an exemplary embodiment of the present invention.

FIG. 3 illustrates a display unit comprising a main screen 300 and a sub-screen 400, in accordance with an exemplary embodiment of the present invention. In FIG. 3, a real-time stock market widget service is allocated to channel 37 of the broadcast receiving apparatus 100. In this situation, channel 37, namely the main screen 300, displays detailed items, for example a main title 310 (STOCK), a current time 320 (2:30 pm 25/1/2008), a channel number 330 (CH 37), a sub-title 340$a$ (KOSPI), a current index 340$b$ (1530.1 p), an upward indication 340$c$ (▲), and a rise of index points 340$d$ (50.2 p). The sub-title 340$a$ (KOSPI), the current index 340$b$ (1530 p), the upward indication 340$c$ (▲), and the rise of index points 340$d$ (50.2 p) may together form a first group 340. The main screen 300 may further display additional detailed items together to form a second group 350, for example a second sub-title 350$a$ (KOSDAQ), a second current index 350$b$ (420.7 p), a downward indication 350$c$ (▼), and a fall of index points 350$d$ (20.4 p). Additionally, these detailed items on the main screen 300 may be received in Markup Language from an external server or hub site. Of course, the position of the detailed items displayed on the main screen 300 and whether or not to construct the sub-screen 400 using only widget information selected among the received widget information may be preset using Markup Language.

The sub-screen 400 may comprise only the sub-title 340$a$, current index 340$b$ and upward indication 340$c$, as shown in FIG. 3. The sub-screen 400 may be constructed in various forms according to the size of the sub-screen (namely, the PIP screen). If the size of the sub-screen 400 is greater than that shown in FIG. 3, another sub-title 350$a$ may additionally appear on the sub-screen 400. Accordingly, the sub-screen 400 may display widget information enough to fill the PIP screen. Additionally, it is possible to display the sub-screen 400 with only part of widget information (that is, part of the detailed items required to provide widget services displayed on the main screen 300), instead of reducing the size of the main screen 300 and displaying the main screen 300. Therefore, a user can use widget services with greater convenience.

Figure 4A:
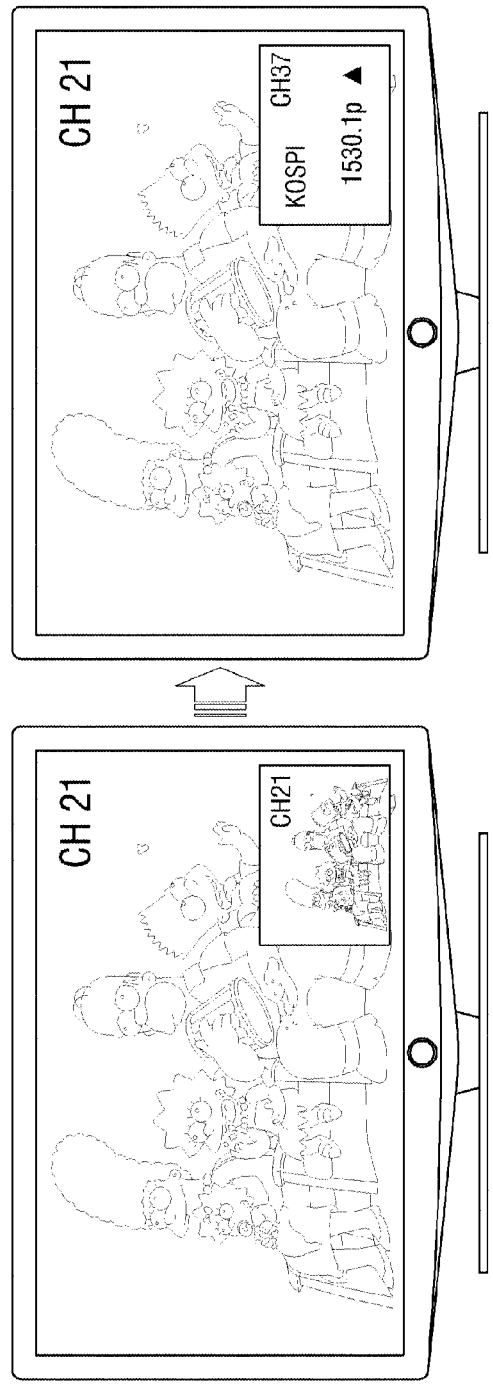

FIGS. 4A and 4B are views illustrating an example of a method for providing a widget service upon occurrence of events, in accordance with an exemplary embodiment of the present invention.

FIG. 4A exemplarily illustrates a situation in which a viewer changes a channel of a sub-screen to a widget service channel, when both the main screen and sub-screen currently display a cartoon film on a general broadcast channel. For example, if a viewer changes channel 21 of the sub-screen to channel 37, namely a widget service channel, only part of detailed items may be displayed on the sub-screen as shown in FIG. 4A, instead of the main screen 300 of FIG. 3 being reduced in size and displayed on the sub-screen in its entirety.

FIG. 4B exemplarily illustrates a situation in which a viewer enters a sub-screen execution command using a remote controller when a main screen displays a cartoon film.

In this situation, if channel 37 is previously set to be executed on a sub-screen, only part of detailed items may be displayed on the sub-screen as shown in FIG. 4B, instead of the main screen 300 of FIG. 3 being reduced in size and displayed on the sub-screen in its entirety.

Figures 5A, 5B:
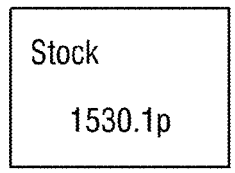
FIGS. 5A and 5B are views illustrating an example of information regarding widgets received in Markup language, according to an exemplary embodiment of the present invention.

FIGS. 5A and 5B are views illustrating an example of widget information received in Markup language, in accordance with an exemplary embodiment of the present invention. In FIG. 5A, the title may be displayed when a PIP screen is executed, and contents of the title may be 'Stock'. When a PIP screen is executed, the date may not be displayed, but the current point may be displayed. FIG. 5B exemplarily illustrates a sub-screen formed by the Markup language shown in FIG. 5A. Herein, it is possible to set only part of all the received widget information to be displayed on the sub-screen by changing values of tags of the Markup language.

Figure 6:
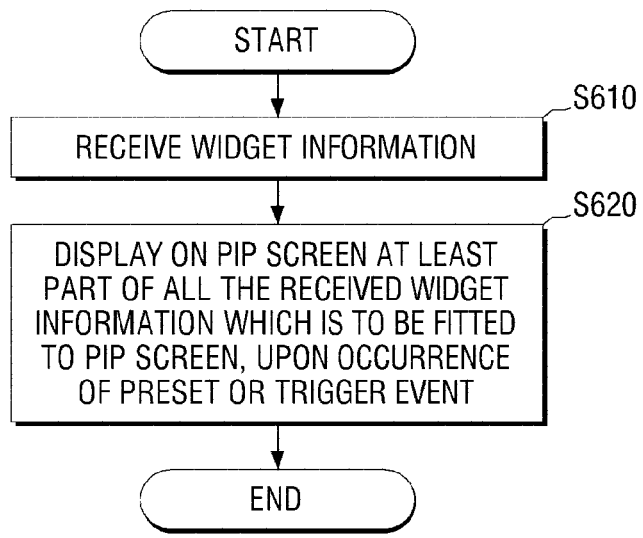
FIG. 6 is a flowchart explaining a method for providing a widget service according to an exemplary embodiment of the present invention.

FIG. 6 is a flowchart explaining a method by which the broadcast receiving apparatus 100 provides widget services according to an exemplary embodiment of the present invention. In FIG. 6, the receiver 110 receives widget information (S610). Upon occurrence of a preset or trigger event, the display unit 120 displays on the PIP screen at least part of all the received widget information which is to be fitted to the PIP screen (S620).

After operation S620, the broadcast receiving apparatus 100 may provide a UI window through which a user can select widget information used to construct a sub-screen from among the received widget information. In other words, to construct a sub-screen, a user can select desired widget information from among the received widget information using the UI window, after displaying the at least part of all the received widget information.

Additionally, the broadcast receiving apparatus 100 may request widget information which is to be fitted to the PIP screen from the external server or hub site, after operation S610 or after occurrence of the preset or trigger event in operation S620. Therefore, the widget information requested by the broadcast receiving apparatus 100 may be changed according to the size of the PIP screen.

Alternatively, the receiver 110 of the broadcast receiving apparatus 100 may receive all the widget information (S610). In this situation, the display unit 120 may select widget information to be fitted to the PIP screen from among all the received information, may rearrange the selected widget information according to the size of the PIP screen, and may display the rearranged information on the PIP screen (S620).

If the size of the PIP screen is changed after operation S620, the broadcast receiving apparatus may extract widget information to be fitted to the PIP screen of which the size has been changed, and may then display the extracted widget information on the PIP screen.

Figure 7:
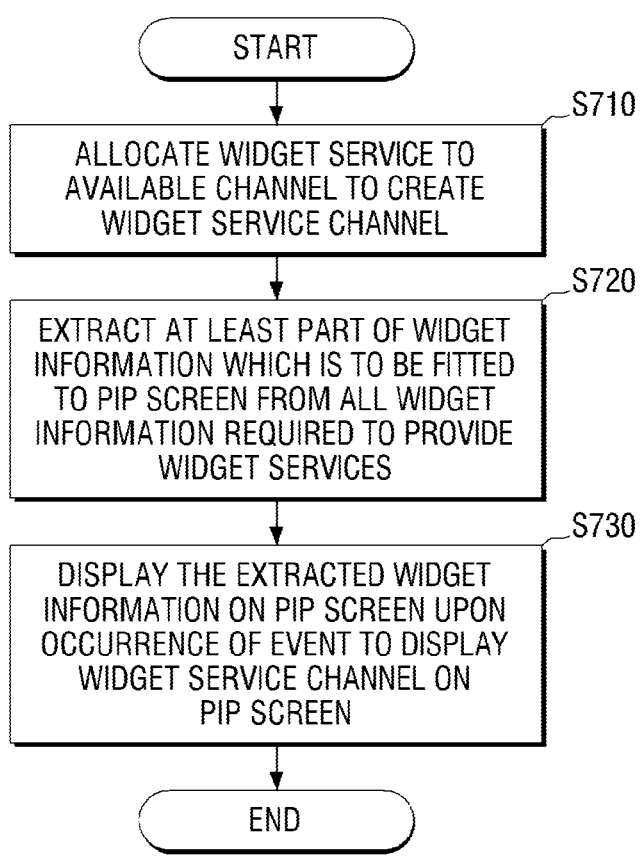
FIG. 7 is a flowchart explaining a method for providing a widget service according to another exemplary embodiment of the present invention.

FIG. 7 is a flowchart explaining a method by which the broadcast receiving apparatus 100 provides widget services according to another exemplary embodiment of the present invention. In FIG. 7, the broadcast receiving apparatus 100 allocates a widget service to an available channel to create a widget service channel (S710). Additionally, the broadcast receiving apparatus 100 extracts at least part of widget information which is to be fitted to a PIP screen from all widget information required to provide widget services (S720), and displays the extracted widget information on the PIP screen upon occurrence of an event to display a widget service channel on the PIP screen (S730).

During operation S730, if a plurality of PIP screens are displayed, widget information enough to fill each of the plurality of PIP screens may appear on each of the plurality of PIP screens. For example, if a weather widget service is provided using two PIP screens, a relatively large PIP screen may display 'weather in Seoul' and 'weather icons', and a relatively small PIP screen may display 'weather in Seoul' only.

The broadcast receiving apparatus and method for providing a widget service that have been described above are not described in excessive detail again with relation to FIG. 7, for purposes of clarity and conciseness.

The foregoing exemplary embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a widget service in a display apparatus, the method comprising:
   receiving a plurality of widget items corresponding to the widget service corresponding to a single channel;
   arranging the plurality of widget items;
   displaying the arranged plurality of widget items in an area on a screen of the display apparatus;
   receiving a user command for changing a size of the area;
   determining a subset of the plurality of widget items, in response to the user command;
   rearranging the determined subset of the plurality of widget items; and
   displaying the rearranged subset of the plurality of widget items in the size-changed area,
   wherein at least one of the receiving and the displaying is performed using a processor, and
   wherein a number of widget items included in the determined subset is less than a number of widget items included in the plurality of widget items, and is determined based on the size of the size-changed area.

2. The method as claimed in claim 1, further comprising:
   providing a user interface (UI) window through which a user selects at least one widget item, from among the received plurality of widget items, to use in constructing the size-changed area.

3. The method as claimed in claim 1, further comprising:
   requesting at least one widget item which is to be fitted to the size-changed area.

4. The method as claimed in claim 1, wherein the receiving the plurality of widget items comprises receiving all widget items, and
   the determining comprises selecting at least one widget item to be fitted to the size-changed area from among all the received widget items, and the rearranging comprises rearranging the selected at least one widget item according to a size of the size-changed area.

5. The method as claimed in claim 1, wherein the plurality of widget items is received in Markup Language from an external server or hub site.

6. The method as claimed in claim 1, further comprising:
   if a size of the size-changed area is changed, then
      extracting, from the received plurality of widget items, at least one widget item to be fitted to the size-changed area of which the size has been changed, and
      displaying the extracted at least one widget item on the size-changed area.

7. A method for providing a widget service in a display apparatus, the method comprising:
   allocating a widget service to an available channel to create a widget service channel;

receiving a user command for changing a size of a display area in a screen of the display apparatus;

determining a subset of a plurality of widget items in the size-changed area, extracted from all of the plurality of widget items required to provide the widget service, in response to the user command, the plurality of widget items corresponding to a single channel;

rearranging the determined subset of the plurality of widget items; and displaying the rearranged subset of the plurality of widget items in the size-changed area, wherein at least one of the allocating, the extracting and the displaying is performed using a processor, and wherein a number of widget items included in the determined subset is less than a number of widget items included in the plurality of widget items, and is determined based on the size of the size-changed area.

8. The method as claimed in claim 7, wherein the command relates to when the size-changed area for displaying the widget service is executed or when a channel of the size-changed area is changed from a general broadcast channel to the widget service channel.

9. The method as claimed in claim 7, further comprising:
providing a user interface (UI) window through which a user selects at least one widget item, from among all the plurality of widget items, to use in constructing the size-changed area.

10. The method as claimed in claim 7, wherein the plurality of widget items is received in Markup Language from an external server or hub site.

11. The method as claimed in claim 7, wherein the displaying comprises displaying a plurality of size-changed areas, and widget items enough to fill each of the plurality of size-changed areas appears on each of the plurality of size-changed areas.

12. The method as claimed in claim 7, further comprising:
if a size of the size-changed area is changed, then
re-extracting, from the all widget items required to provide the widget service, at least one widget item to be fitted to the size-changed area of which the size has been changed, and displaying the re-extracted information on the size-changed area.

13. A display apparatus comprising:
a receiver which receives a plurality of widget items which is arranged and displayed in an area on a screen of the display apparatus, and which receives a user command for changing a size of the area, the plurality of widget items corresponding to a single channel; and a display unit which determines a subset of the received plurality of widget items, in response to the user command, and which rearranges the determined subset of the plurality of widget items and displays the rearranged subset of the plurality of widget items in the size-changed area, wherein a number of widget items included in the determined subset is less than a number of widget items included in the plurality of widget items, and is determined based on the size of the size-changed area.

14. The display apparatus as claimed in claim 13, further comprising:
a user interface (UI) unit which provides a UI window through which a user selects at least one widget item, from among the received plurality of widget items, to use in constructing the size-changed area.

15. The display apparatus as claimed in claim 13, wherein the plurality of widget items is received in Markup Language from an external server or hub site.

16. The display apparatus as claimed in claim 13, further comprising:
a controller which allocates a widget service to an available channel to create a widget service channel; and
a scanning unit which scans channels,
wherein, if there is the available channel among the scanned channels, the controller allocates the widget service to the available channel to create the widget service channel.

17. The display apparatus as claimed in claim 13, wherein, if a size of the size-changed area is changed, the display unit displays at least one widget item to be fitted to the size-changed area of which the size has been changed.

* * * * *